Feb. 1, 1938.                T. JENSEN ET AL                2,107,002
                    HELICAL SINGLE KNIFE TYPE BREAD SLICER
                         Filed Feb. 27 1934          3 Sheets-Sheet 1

INVENTOR
Thormod Jensen
BY Anton Van Veen
Sydney J. Prescott
ATTORNEY

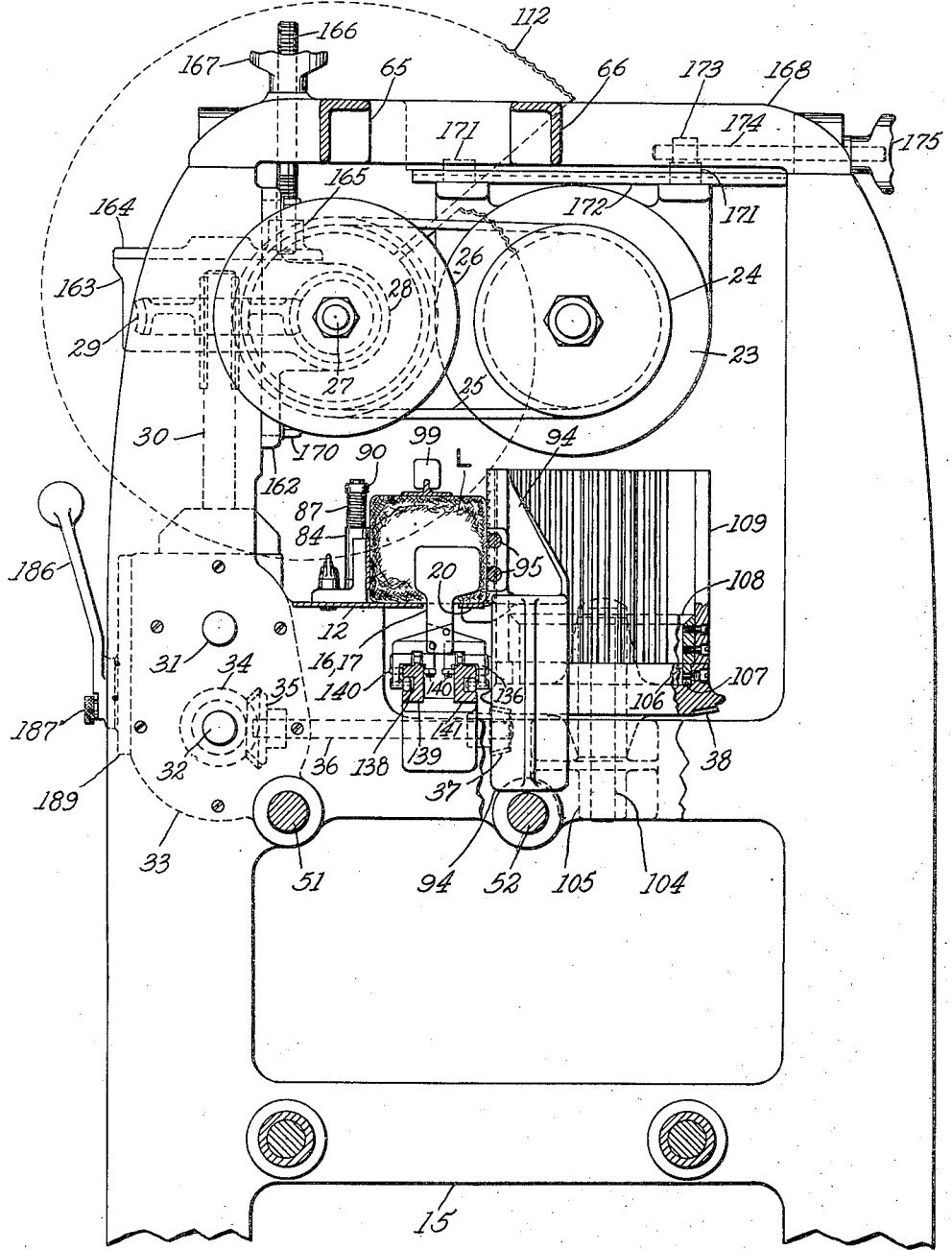

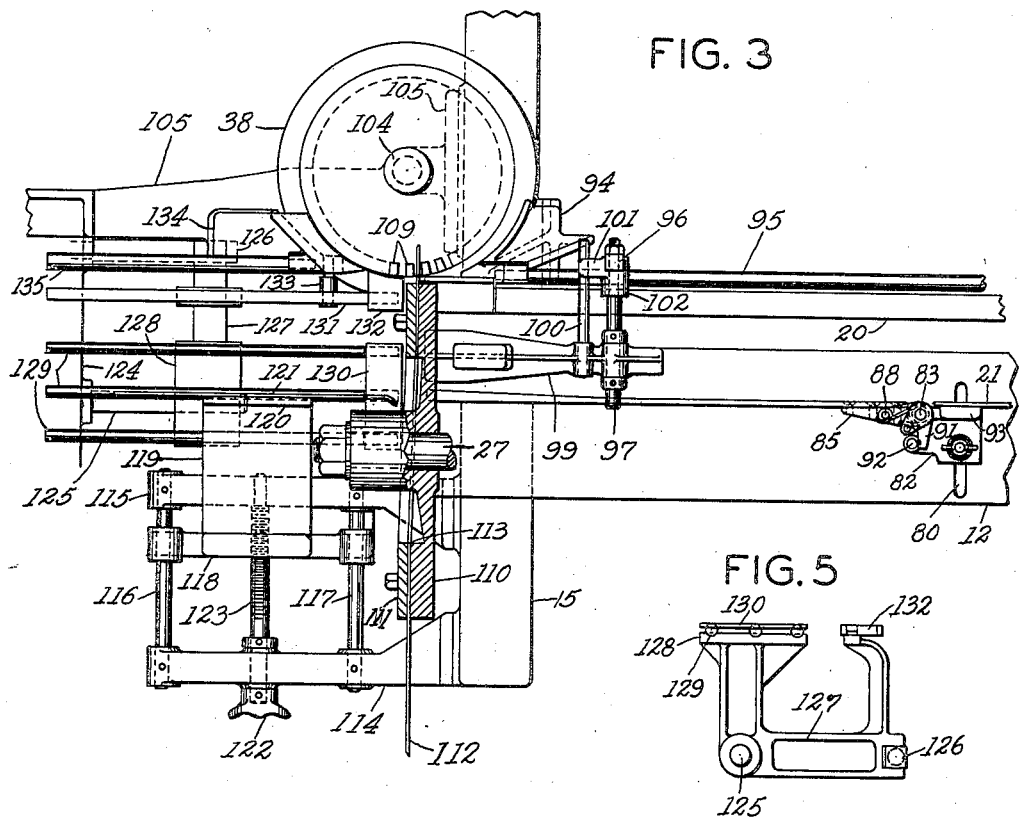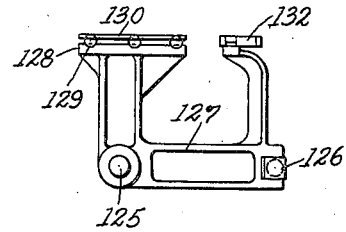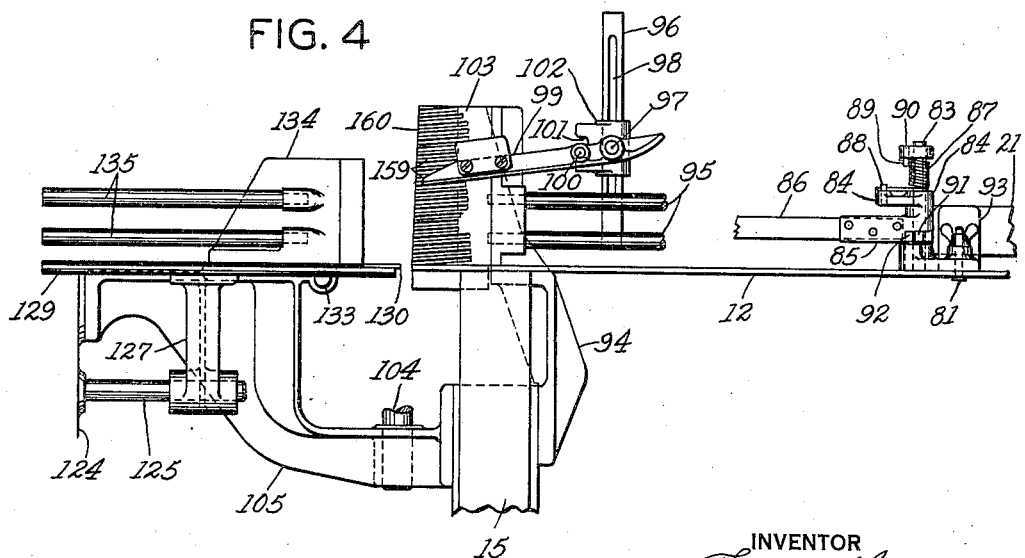

Patented Feb. 1, 1938

2,107,002

UNITED STATES PATENT OFFICE 2,107,002

HELICAL SINGLE KNIFE TYPE BREAD SLICER

Thormod Jensen, Laurelton, and Anton Van Veen, Brooklyn, N. Y., assignors to American Machine & Foundry Company, a corporation of New Jersey Application February 27, 1934, Serial No. 713,174

9 Claims. (Cl. 146—95)

This invention relates to slicing machines, more particularly to bread slicing machines, its main object being the production of a bread slicing machine operating to slice a loaf while it is being continuously advanced. A further object of the invention is to provide a rotary knife which has a volute cutting edge and is distorted into a helical form every portion of which lies on radii perpendicular to the shaft on which the knife is mounted, whereby the loaf will be sliced as it is moved under the knife. Still another object is to firmly support the loaf during the slicing thereof by steadying the loaf conveyor during its travel under the knife and backing up the loaf against the thrust of the knife. With these and other objects not specifically mentioned in view, the invention consists in certain constructions and combinations hereinafter fully described and then specifically set forth in the appended claims.

In the accompanying drawings which form a part of this specification and in which like characters of reference indicate the same or like parts:

Fig. 2 is a detail sectional view of the slicer mechanism taken on line 2—2 of Fig. 1;

Fig. 3 is a partial top view of the same showing the means for guiding and holding the loaf while being sliced;

Fig. 4 is a side elevation of the same; and

Fig. 5 is a detail end view of the runway.

Figure 1:
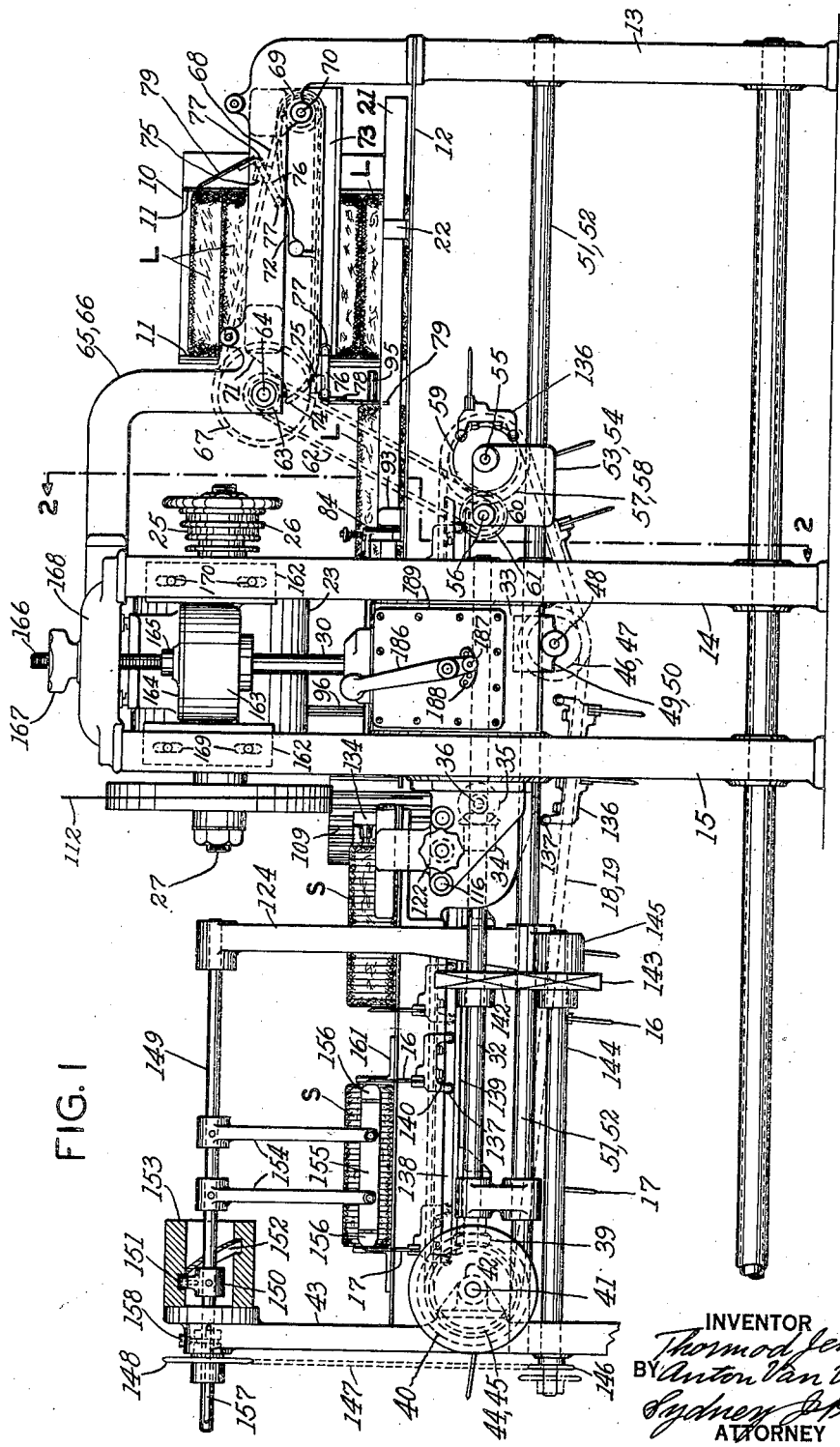
Fig. 1 is a side elevation of the bread slicing machine showing the infeed, slicing and transfer mechanisms.

In carrying the invention into effect there is provided a helical knife having a volute cutting edge, means for rotating said knife, and mechanism for advancing a loaf continuously across the path of said knife. In the best constructions contemplated said means includes a shaft, a flange fast on said shaft and having a helical face lying on radii perpendicular to the axis of the said shaft, and a clamp plate secured to said flange, and the knife having a central aperture in which the hub of the flange is fitted, the knife being clamped against the helical face of said flange by said plate and thus distorted into helical form. The mechanism for continuously advancing the loaves across the path of the knife may include in the best constructions contemplated a pair of traveling endless chains each provided with a plurality of spaced flights rigidly connected thereto, each flight on one chain being disposed to clamp a loaf against an adjacent flight on the other chain, a pair of stationary bars parallel to said chains, and provided with a longitudinal track, and series of rollers rigidly connected to said flights and arranged to enter said tracks and bear against the sides of said bars to steady the flights while they are advancing a loaf across the path of the knife. These various means and parts may be widely varied in construction within the scope of the claims for the particular machine selected to illustrate the invention is but one of many possible concrete embodiments of the same. The invention, therefore, it not to be restricted to the specific construction shown and described.

Referring to Fig. 1 of the drawings, the infeed chute 10 is suitably supported in inclined position by floor posts (not shown), the chute 10 having relatively adjustable side walls 11. At its lower end, the chute 10 delivers the loaves onto a table 12 supported on the frames 13, 14, and 15. The flights 16 and 17 attached to chains 18 and 19, respectively, enter the space between the table 12 and plate 20 (Figs. 2 and 3) to advance the loaves. Table 12 is provided with an adjustable sidewall 21 supported by angle 22 to bear against one side of the loaf as it is advanced along the table.

On the shaft of motor 23 is mounted a pulley 24 which by means of a belt 25 drives a pulley 26 on knife shaft 27. Shaft 27 carries a worm 28 meshing with a worm wheel 29 mounted on a vertical shaft 30. The shaft 30 by means of a gear (not shown) drives a shaft 31 which in turn, through a suitable gear transmission (not shown) drives a shaft 32. The gear transmission is enclosed in a housing 33 supported by the frames 14 and 15.

One end of the shaft 32 carries a bevel gear 34 which meshes with a gear 35 mounted on shaft 36. A bevel gear 37 mounted on the other end of shaft 36 meshes with a gear 38 (see Fig. 2). At the other end of shaft 32 there is mounted a bevel gear 39 (see Fig. 1) which drives a gear 40 carried by a shaft 41 supported in bearings 42 attached to the frame 43. The shaft 41 carries a pair of sprockets 44 and 45 which drive the conveyor chains 18 and 19 respectively. The chains run over a set of idler sprockets 46 and 47 mounted on a shaft 48 carried by bearings 49 and 50 fastened to the tie bars 51 and 52. The tie bars also carry bearings 53 and 54 supporting cross shafts 55 and 56, the former carrying a set of idler sprockets 57 and 58 over which run the conveyor chains. A gear 59 mounted on shaft 55 meshes with a gear 60, attached to cross shaft 56.

The shaft 56 carries a sprocket 61 which drives a chain 62 running over a sprocket 63 fastened to a shaft 64, the same being mounted in brackets 65 and 66. A second sprocket 67 carried by shaft 64 drives a transfer chain 68 running over an idler sprocket 69 carried by shaft 70, the shaft being supported in brackets 65 and 66. The rear bracket 66 carries a guide bracket 71 provided with a cam surface 72, a track 73 and a curved guide surface 74. The conveyor chain 68 has a set of spaced blocks 75 which carry pivotally mounted arms 76, the arms 76 being equipped with rollers 77. The projecting ends 78 of the arms 76 support the pusher plates 79. The rollers 77 of the hanging arms 76 encounter the cam surface 72, and gradually lift the same from a horizontal to a vertical position. The continued movement of the chain brings the rollers 77 into engagement with the track 73 thus assuring a vertical position of the pusher 79 while transferring the loaf along table 12.

Referring now to Figs. 3 and 4, the table 12 is provided with a transverse slot 80, in which is fitted a stud 81 carrying a bracket 82. The bracket 82 supports a stud 83 (see Fig. 4) on which is loosely mounted an arm 84 having a lug 85 attached to the yieldingly mounted guide 86 aligned with wall 21. A torsion spring 87 mounted on stud 83 has two extending ends, one of which bears against a pin 88 in arm 84 and the other against a pin 89 fastened in an adjustably mounted cap 90 on stud 83. The arm 84 is also provided with a lug 91 which engages a stop pin 92 mounted in the bracket 82. A lug 93 which is part of bracket 82 supports the adjacent end of side wall 21.

The frame 15 supports a bracket 94 carrying guide bars 95 which extend to the infeed chute 10, and have a slotted bar 96 attached thereto (see Figs. 3 and 4). On stud 97 engaging in slot 98 of bar 96 is pivoted a weighted arm 99 carrying a pin 100 engaging in a yoke 101 of a block 102 mounted on stud 97.

The bracket 94 also supports a grooved ledger plate 103 (see Fig. 4). The bevel gear 38, which revolves loosely on a stud 104 carried by a bracket 105 (see Fig. 2), has an annular recess 106 which receives a shouldered portion 107 of the cage base 108. The cage base 108 has a plurality of spaced vertical slots in which are fastened the upright strips 109 constituting what may be termed a cage. The inclined ridges or fingers separating the grooves in the ledger plate press into the side of the loaf and hold it down firmly on the table 12.

Between the flange 110, which is fast to the shaft 27, and a clamp plate 111 is held a knife 112 having a serrated volute cutting edge and a central aperture fitted on the hub of flange 110. The flange 110 has a helical face lying on radii perpendicular to the axis of the shaft 27 (Fig. 3), 113 the pitch or lead of which corresponds to the thickness of slice required. The knife 112 and clamp plate 111 are split so that they may be readily distorted into helical form and seat properly on the helical face of the flange when the screws securing the clamp plate (Fig. 3) to the flange are tightened.

The frame 15 also supports two brackets 114 and 115 (see Fig. 3) in which are fixed the stationary guide rods 116 and 117. An adjustable slide 118 mounted on the rods 116 and 117 has a projecting member 119, the end of member 119 having an upwardly extending lug 120 to which is fastened a guide plate 121 aligned with guide 86. A knob 122 is provided on the threaded spindle 123 for turning the same to adjust the slide 118 with guide plate 121.

A bracket 124 clamped to tie bars 51 and 52 supports rods 125 and 126 (Fig. 3), and on the rods is mounted an adjustable bracket 127 provided with a wide platform 128 supporting three rods 129, one end of the rods carrying a gap plate 130 (see Figs. 3 and 4). Bracket 127 is also provided with an integral narrow platform supporting a bar 131 which at one end carries a gap plate 132. A stud 133 projecting from the slice guide 134 acts as a support for the bar 131. The slice guide 134 also carries a set of guide bars 135.

The flights 16 (Figs. 1 and 2) are fastened to spaced carriages 136 each secured to the ends of one of the links of chain 18 and supporting rollers 137 which engage in the track 138 of the front bar 139 during the travel of chain 18. The bar 139 is placed in the space between the conveyor drive sprockets 44 and 45 and the idler sprockets 57 and 58. The carriages 136 also support a double set of rollers 140 which ride on the sides of the bar 139. In this manner the flights 16 are firmly held against the loaf while conveying the loaf past the slicing knife 112. The flights 17 are attached to carriages 136 mounted in the same manner on chain 19, and are guided by means of rollers on the carriages entering a track in rear bar 141 similar to that of bar 139, whereby each flight 17 is rigidly held in upright position to clamp a loaf against the adjacent flight 16 while the latter advances the loaf along the table 12.

The shaft 32 (Fig. 1) also carries a gear 142 meshing with a gear 143 on shaft 144, one end of shaft 144 being supported in a cap 145 fastened to the bracket 124 and its other end being supported in a bearing of the frame 43. A sprocket 146 attached to the end of shaft 144, through a chain 147 running over sprocket 148, imparts motion to the transfer shaft 149. An arm 150 attached to shaft 149, has a roller 151 engaging in the track 152 of a stationary drum cam 153. A set of arms 154 fixed to shaft 149 support a pusher plate 155 which has hinged end pieces 156 yieldingly held in alignment with the pusher plate by torsion springs (not shown) the end pieces being swung back on their hinges whenever any one of the flights 16—17 obstructs their travel. The sprocket 148 which is slidably mounted on a key 157 in shaft 149 is held against axial movement by means of a plug 158 which engages in a circumferential groove provided in the hub of sprocket 148. It may be noted that a very slight disalignment of the flights 16—17 with the end faces of the end pieces 156 is sufficient to obstruct the travel of the latter, since the spaces between the same and the inner faces of the flights must be very narrow in order to eject the end slices with the rest of the sliced loaf.

The operation of the machine is as follows: The loaves L to be sliced are placed in the inclined chute 10, the lowermost loaf on reaching the table 12 stopping against the side wall 21. In this position the loaf lies directly in the path of one of the pushers 79 which conveys the loaf along table 12. While the loaf is being advanced by the pusher 79 one of the flights 17 arrives in front of the loaf and travels along idle until the rear roller 77 attached to the pusher arm 76 leaves the track 73 and follows the rounded guide surface 74. In so doing the pusher 19 is gradually lifted from the loaf while the rear flight 16 travels around the sprocket 57 and assumes an upright position in which it engages the loaf. In this manner the loaves are clamped between the front and rear flights of the conveyor and are advanced between the guide 86 and guide bars 95 towards the slicing unit.

During its travel through the slicing position the loaf is held down on the table 12 and plate 20 by the weighted top tension arm 99, and resiliently held against the guide 86 and the table by the fingers formed by the grooves 159 in the ledger plate 103. The knife 112 cuts down through the loaf along the inclined edge 160 of the ledger plate 103 while the loaf is being forwarded, the rim of the knife passing through the gap beyond the end of table 12 and plate 20 into one of the spaces between the upright strips 109 of the cage while cutting through the bottom of the loaf. The speed of rotation of the cage and knife is so timed that the leading end of the knife edge near the split will enter the next space in the cage after starting the next cut in the top of the loaf. The upright strips 109 serve to back-up or hold the unsliced portion of the loaf beyond the ledger plate 103 while the same is being cut. By this means the loaves are sliced while continuously advancing.

In their further travel the sliced loaves are conveyed across the gap plates 130 and 132 over the runway consisting of the rods 129 and the bar 131, and between the side guide 121 and guide bars 135. The continued advance of the conveyor brings the sliced loaf S to its transfer position where the pusher 155 follows the advancing loaf and at the same time gradually moves toward the loaf and ejects it from between the flights 16 and 17. The loaf is then propelled between side guides 161, which lead to the wrapping machine, by the ejection of the following loaves from the conveyor.

The knife shaft 27 is mounted in hangers 162 which are part of the worm housing 163. A cover 164 which closes the top of the housing 163 is provided with a boss 165 in which is threaded an adjusting screw 166 having a knob 167 threaded thereon. The knob 167 is seated against a pad on the motor carrier plate 168 attached to the frames 14 and 15. The base of the hangers 162 is provided with elongated slots 169 receiving screws 170 which fasten the same to the frames 14 and 15. It will be readily seen that by loosening the screw 170 and turning the knob 167 the position of the knife can be raised or lowered. However, it is desirable that in all adjusted positions of the knife that the axis of the shaft 27 on which it is mounted be inclined sufficiently, as shown in the drawings, to cause the cutting edge of the knife to move through a path substantially perpendicular to the axis of the loaves.

The feet of motor 23 are equipped with gibs 171 mounted on slide bars 172 which are fastened to the plate 168. A cross bar 173 spanned across the rear gibs has a tapped bore into which is threaded an adjusting screw 174 having a knob 175 which provides means for adjusting the motor to regulate the tension of the belt 25.

When a different thickness of slice is desired, another knife flange and cage are substituted; and the speed of the conveyor must also be changed in accordance with the thickness of the slice, as the thinner the slice the slower must be the speed of the conveyor. A shift handle 186 operates a yoke (not shown) which changes the gear ratio of the transmission, which is of a well known type and enclosed in housing 33. A plug 187 attached to handle 186 engages in indexing holes 188 located in a cover 189 of the housing 33, said holes being marked for the thickness of slice desired.

What is claimed is:

1. In a bread slicing machine, the combination with a helical knife, of means for rotating said knife, a table beneath said knife, mechanism for continuously advancing a loaf lengthwise of said table and across the path of said knife, a guide on the table arranged to bear against one side of the advancing loaf, and a stationary ledger plate arranged to engage the other side of said loaf and having an inclined edge along which the cutting edge of said knife moves while cutting a slice from the loaf, the inner face of said ledger plate being grooved lengthwise from its inclined edge to provide ridges adapted to press into the advancing loaf and hold it down on said table, said knife rotating in a direction to move the lower edge of said knife against said ledger plate.

2. In a bread slicing machine, the combination with a helical knife, of means for rotating said knife, mechanism for advancing a loaf continuously below the axis of said knife and across its path, a stationary ledger plate arranged to engage one side of the loaf and oppose the side thrust thereon while it is being sliced and having an inclined edge along which the cutting edge of said knife moves while cutting a slice from the loaf, and a rotary cage adjacent said ledger plate and having circumferentially spaced upright bars which back up the portion of the loaf projecting beyond said inclined edge while the loaf is being sliced.

3. In a bread slicing machine, the combination with a helical knife, of means for rotating said knife, a table beneath said knife, mechanism for continuously advancing a loaf lengthwise on said table and across the path of said knife, a guide on said table arranged to bear against one side of the advancing loaf, a stationary ledger plate arranged to engage the other side of said loaf and oppose the side thrust thereon and having an inclined edge along which the cutting edge of said knife moves while cutting a slice from the loaf, and a rotary cage adjacent said ledger plate and having circumferentially spaced upright bars which back up the portion of the loaf projecting beyond said inclined edge while the loaf is being sliced.

4. In a bread slicing machine, the combination with a helical knife having a volute cutting edge, of means for rotating said knife, a table beneath said knife, mechanism for continuously advancing loaves lengthwise on said table and across the path of said knife, and a device for delivering loaves into the range of action of said mechanism, said mechanism including a pair of driven sprockets, a pair of idler sprockets, and a pair of chains running over said sprockets and each provided with flights rigidly connected thereto, each flight on one chain being disposed to clamp a loaf endwise against an adjacent flight on the other chain, and said device including a traveling chain disposed above said table and provided with an arm pivotally mounted thereon, a pusher on said arm adapted to engage the end of a loaf on said table and push it into the path of said flights, a stationary horizontal track, a roller on said arm adapted to enter said track to turn said pusher into vertical position to engage a loaf on the table, and a stationary guide surface arranged beyond said track to engage said roller to turn said pusher upwardly and thereby cause it to clear the loaf being pushed.

5. In a bread slicing machine, the combination with a helical knife having a volute cutting edge, of means for rotating said knife, a table beneath said knife, mechanism for continuously advancing loaves lengthwise on said table and across the path of said knife, a device for delivering loaves into the range of action of said mechanism, while the same are being continuously advanced and a device for ejecting the sliced loaves from said mechanism, said ejecting device including a slidable shaft parallel to the path of the sliced loaves, and a sprocket splined to said shaft, a pair of arms fast to said shaft, and a pusher carried by said shaft.

6. The combination with a table, of mechanism for continuously advancing loaves lengthwise on said table, a device for delivering loaves into the range of action of said mechanism, and a device for ejecting the loaves from said mechanism while the same are being continuously advanced, said ejecting device including a slidable shaft parallel to the path of the sliced loaves, and a pusher carried by said shaft.

7. The combination with a table, of mechanism for continuously advancing loaves of bread endwise along said table, slicing means including a knife and means for imparting movement to said knife to cut across the path of the loaves and at the same time follow their endwise movement, and means for delivering loaves into the range of action of said mechanism, said mechanism including sprockets, endless chain means passing over said sprockets provided with flights disposed to clamp a loaf endwise against an adjacent flight, co-operating flights being arranged to separate as a result of passage over one of said sprockets, and said device including a pusher adapted to engage a loaf and push it into the path of said flights while one of said flights is separated from the adjacent co-operating flight.

8. In a bread slicing machine, the combination with a helical knife having a volute cutting edge, of means for rotating said knife, a table beneath said knife, mechanism for continuously advancing loaves lengthwise on said table and across the path of said knife, said mechanism being adapted to individualize the loaves, and a device for ejecting the sliced loaves from said mechanism while they are being continuously advanced in separate, individualized disposition, said ejecting device operating to eject the slices collectively while maintaining them positively in assembled relation, as an entire sliced loaf unit.

9. In a bread slicing machine, the combination with a helical knife having a volute cutting edge, of means for rotating said knife, a table beneath said knife, mechanism for continuously advancing loaves lengthwise on said table and across the path of said knife in positively gripped individualized disposition, a device for delivering loaves into the range of acton of said mechanism, and a device for ejecting the sliced loaves, each as a unit, from said mechanism, while the collective slices are being continuously advanced in positively gripped assembly at right angles to the axis of rotation of the slicer.

THORMOD JENSEN.
ANTON VAN VEEN.